United States Patent [19]

Klever et al.

[11] Patent Number: 4,823,542
[45] Date of Patent: Apr. 25, 1989

[54] LAWN MOWER COMBINATION

[75] Inventors: Manfred Klever, Saarbrücken-Scheidterberg; Karl-Heinz Rott, Saarbrücken-Bubingen, both of Fed. Rep. of Germany

[73] Assignee: Gutbrod-Werke GmbH, Saarbrucken-Bubingen, Fed. Rep. of Germany

[21] Appl. No.: 112,488

[22] Filed: Oct. 26, 1987

[30] Foreign Application Priority Data

Oct. 25, 1986 [DE] Fed. Rep. of Germany ....... 3636385

[51] Int. Cl.$^4$ ............................................. A01D 34/67
[52] U.S. Cl. ...................................... 56/17.5; 56/12.7; 56/255
[58] Field of Search ...................... 56/16.7, 16.9, 17.2, 56/17.5, 255, 12.7, 295

[56] References Cited

U.S. PATENT DOCUMENTS

| 3,874,151 | 4/1975 | Seifert et al. | 56/17.2 |
| 4,007,526 | 2/1977 | Longenstein | 56/17.5 |
| 4,114,354 | 9/1978 | Morris | 56/295 |
| 4,258,536 | 3/1981 | Kidd et al. | 56/17.5 |
| 4,287,709 | 9/1981 | Lowry et al. | 56/16.9 |
| 4,341,060 | 7/1982 | Lowry et al. | 56/17.5 |
| 4,343,139 | 8/1982 | Lowry et al. | 56/16.9 |
| 4,389,836 | 6/1983 | Lowry et al. | 56/16.9 |
| 4,411,126 | 10/1983 | Lowry et al. | 56/17.2 |
| 4,428,183 | 1/1984 | Lowry et al. | 56/17.2 |
| 4,520,619 | 6/1985 | Doi et al. | 56/16.9 |
| 4,587,800 | 5/1986 | Jimenez | 56/17.2 |
| 4,688,376 | 8/1987 | Wolfe, Sr. | 56/16.7 |

*Primary Examiner*—Paul J. Hirsch
*Attorney, Agent, or Firm*—Holman & Stern

[57] ABSTRACT

A mobile lawn mower is designed multi-part in that the four-wheel carriage housing is provided with a center opening for lockable accommodation of a self-acting so-called grass trimmer, such design permitting operation of the lawn mower as such or the use of the grass trimmer by itself.

9 Claims, 2 Drawing Sheets

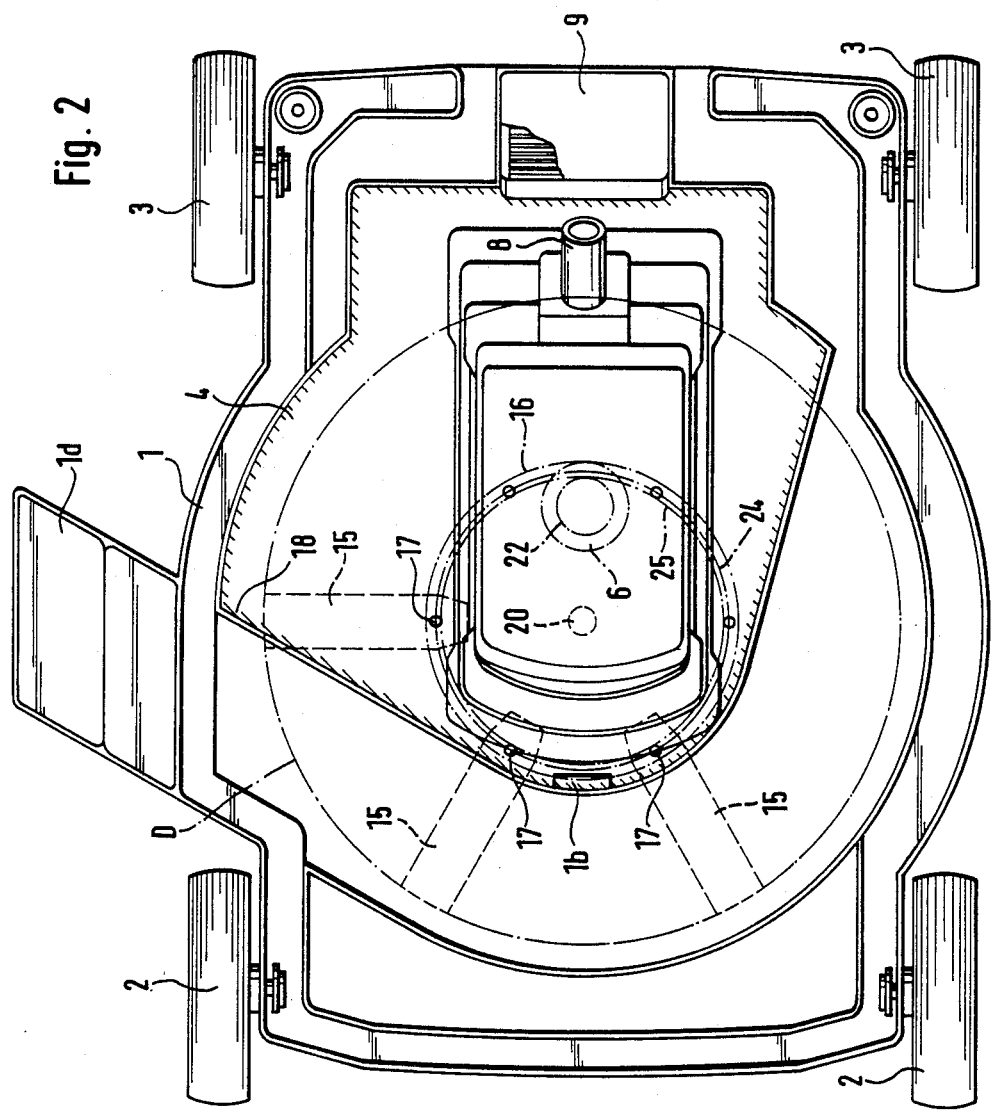

LAWN MOWER COMBINATION

FIELD OF THE INVENTION

The invention relates to a mobile lawn mower with electric motor driven mower blades rotating in the horizontal plane and with a four-wheel carriage housing covering the horizontal blade plane.

Such conventional electric lawn mowers are available on the market in various sizes, however, they are cumbersome in weight and, therefore, unhandy and inconvenient when required to be conveyed about, considering that such gardening tools are generally stored in cellars, garages and the like.

BACKGROUND OF THE INVENTION

The object of the invention is to provide a conventional electric lawn mower in multipart form for the purpose of facilitating conveyance and stowing of the mower, a form which will permit easy assembly of the individual parts without the aid of additional tools.

SUMMARY OF THE INVENTION

The solution of this object is given in claim 1. Accordingly, the new lawn mower comprises a carriage housing provided with a center opening, the carriage housing being light in weight in that it is merely to accommodate the four wheels and the wheel level adjustment mechanism; and a self-acting non-wheel grass trimmer known as such, which includes the mowing mechanism and electric motor, a rear protective casing and a guide bar and handle connected to the protective casing. This basic insertion device need merely be provided with a backing edge surface which coincides with the configuration of a backing surface surrounding the center opening of the carriage housing. Upon insertion of said basic device into the carriage opening, it is merely required to be locked to the carriage housing to form a fully adequate mobile lawn mower together with the carriage housing. The invention includes the use of a multiple of mowing blades arranged articulation-like on the circumference of a disc type rotating member, as has become known from the international publication WO 86/03092. The diameter of the disc type rotating member may thus be sized to just permit insertion of the mowing mechanism into the carriage opening, since the articulated mowing blades may be pivoted inwardly by hand to a point within the outline of the rotating member. The centrifugal force will let the blades orientate radially to form a large blade circle as would be suitable for a mobile lawn mower.

The special advantage of the inventive multipart feature for use on a mobile lawn mower not only consists in the fact that the light-weight carriage housing and the handy basic insertion device with its single-arm guide bar may be conveniently conveyed in the separated condition but, additionally, the grass trimmer type basic device offers a grass and lawn cutting facility which so far had to be purchased as an additional device for the handling of lawn edges, brush and other garden areas difficult of access. In respect of the lawn mowing function of the basic insertion device, it is desirable to have the blade circle in the direction of motion of the assembled lawn mower extend beyond the front area of the backing edge surface of the basic device, i.e. beyond the front area facing the direction of motion, in order that the lawn mower housing may be designed worm-like for lateral discharge of the grass clippings. According to the invention, the rotational axis of the rotating member is transposed as against the shaft of the electric motor toward the two front wheels of the carriage housing and the rotating member is provided with a spur geared edge section which meshes with a pinion gearing on the electric motor. Downgearing of the motor speed accompanying such type design permits the use of high-speed electric motors.

Further advancements of the inventive lawn mower combination are given in claims 3 to 6. Special attention is drawn to the handling convenience of the locking mechanism which is designed as a foot pedal for ready attachment of the basic insertion device to the carriage housing of the lawn mower.

When a lawn mower combination as offered by the invention is provided with a motor adequately powered for the purpose, the basic insertion device is likely to be rather heavy in weight. It is therefore recommended to provide the protective casing of the basic device with a gliding bow which remains clear of the ground in the inserted condition of the basic device.

BRIEF DESCRIPTION OF THE DRAWINGS

One inventive example of the lawn mower combination is illustrated in the drawings in which FIG. 2 is a plan view of FIG. 1.

DETAILED DESCRIPTION OF PREFERRED EMBODIMENT OF THE INVENTION

Figure 1:
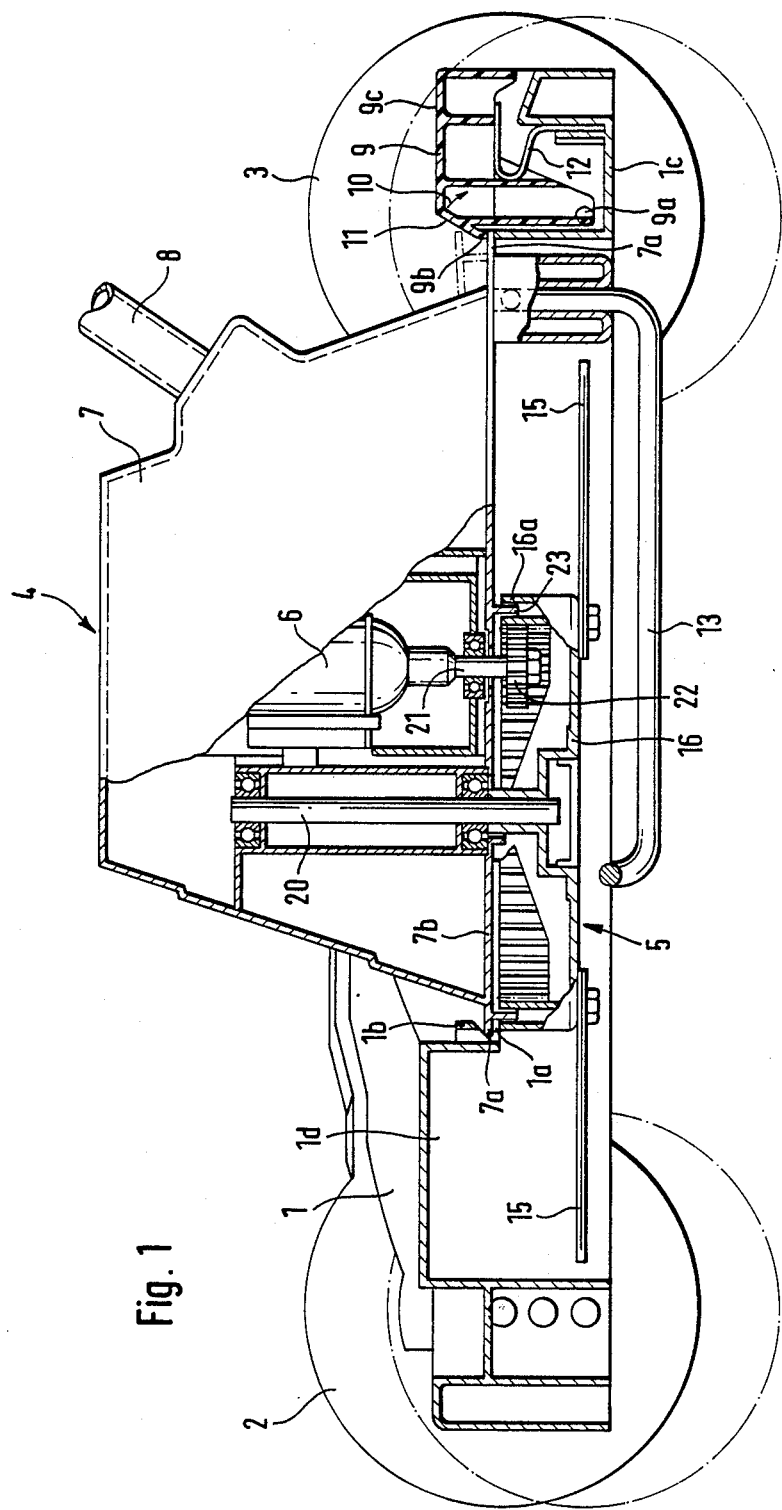
FIG. 1 is a longitudinal section through the device assembled for use as a lawn mower, which includes a partial view.

The lawn mower combination essentially consists of two combining units, i.e. of the carriage housing 1 with front wheels 2 and hind wheels 3 and, secondly, of a basic insertion device 4 which is a self-acting so-called grass trimmer comprising a mowing mechanism 5 and electric motor 6, a protective casing 7 and a single-arm guide bar 8 connected to the protective casing and shown only in part. In FIG. 2, the outline of the casing 7 of the basic insertion device is indicated by hatching which also defines the contour of a center opening in the carriage housing 1. Said opening is framed by a horizontal backing surface 1a which corresponds with a backing edge surface 7a on the basic insertion device. As shown in FIG. 1, a hold-down claw 1b is located above the carriage backing surface 1a in its area toward the front wheels 2. The front area of the backing edge surface 7a of the basic insertion device 4 may be slantingly inserted underneath the hold-down claw 1b also shown in the plan view in FIG. 2, to lock the front area of the basic device in place on the carriage housing 1. In the area opposite the claw 1b, the backing edge surface 7a is provided with a switchable locking mechanism consisting of a foot pedal 9.

The foot pedal 9 is a plastic die-cast part and is pivotally supported on two journals 9a in the rearward section 1c of the carriage housing 1 for movement in the direction of the arrow. The foot pedal 9 further includes a hold-down claw 9b formed thereon. In the locking pivot position of foot pedal 9, the claw 9b will overlap and lock down the backing edge surface 7a of the basic insertion device. The hold-down claw 9b is provided with an inclined stop surface 11 to permit automatic locking of the backing edge surface 7a. Upon insertion of the basic device 4 from a slanting position as indicated by dash-dots, said edge surface 7a will run up against the stop surface 11 and, upon further down-movement, it will force the foot pedal 9 to yield in the direction of arrow 10 until the pressure of the plate spring 12 will let the foot pedal 9 automatically return into the locking position shown. Inversely, pressure application on the surface 9c of the foot pedal 9 will release the area of the backing edge surface 7a allocated thereto and let the basic insertion device 4 come clear of the carriage housing 1.

The protective casing 7 of the basic insertion device 4 is equipped with a gliding bow 13 which remains clear of the ground in the combination shown in FIG. 1, i.e. it will never come into contact with the ground in whatever wheel level adjustment position the carriage housing 1 may be. When the basic insertion device is detached from the carriage housing 1, it will function as a self-contained self-acting grass trimmer. A further advantage of the two-part lawn mower design offered by the invention is that the carriage housing 1 and wheels 2, 3 may be conveyed separately from the basic insertion device for stowing when not in use.

The mowing mechanism 5 of the basic insertion device 4 features mowing blades 15 articulatingly attached to the circumference of a plate-like rotating member 16 by hinged bolts 17, as also defined in FIG. 2 in which the mowing blades 15 orientating radially under the centrifugal force are not shown in full member. Such articulation feature of the mowing blades 15 is essential in that it permits of a relatively large blade circle diameter D (FIG. 2) appropriate for a lawn mower without requiring the center opening in the carriage housing 1—indicated by hatching 18 in FIG. 2—to be enlarged which would also require considerable enlargement of the carriage housing 1 for stability. A few of the mowing blades 15 need merely be pivoted inwardly by hand to a point at which the blades come to lie within the outline of the rotating member 16 and the basic insertion device 4 will readily click into place on the carriage housing 1.

As shown in FIG. 1, the rotational axis 20 of the rotating member 16 is transposed as against the drive shaft 21 of the electric motor 6 toward the two front wheels 2 of the carriage housing 1. The rotating member 16 has an edge section 16a provided with an internal spur gearing to mesh with the rotor pinion 22 of the electric motor 6. The edge section 16a is further provided with an open-top slot to receive a stabilizing ring 23 formed on the bottom wall 7b of the protective casing 7.

The mowing mechanism 5 and its drive, not visible, is sketched out in dashed or dash-dot lines in FIG. 2. Circle 6 is the circumference of the electric motor 6, whereas circle 16 defines the circumference of the rotating member 16, the internal gearing (pitch circle 25) of which meshes with the rotor pinion 22 (pitch circle 22). The hinged bolts 17 for the articulated mowing blades 15 are positioned on circle 24.

A further result of the eccentric arrangement of the mowing mechanism 5 as against the electric motor 6 is that, in the area near the front wheels 2, the mowing blades project far beyond the contour of the opening (hatching 18), which permits the carriage housing 1 to be designed as a worm-like slightly inclined channel 1d for lateral discharge of the grass clippings.

We claim:

1. A mobile lawn mower of the type having rigid blades rotating in a horizontal mowing plane, comprising in combination:

a self-acting portable grass trimmer having a protective casing having an outer backing edge surface, a single-arm guide bar connected to said protective casing, and a mowing mechanism which includes a motor and a disc type rotating member drivingly connected to said motor for being rotationally driven thereby, said rotating member carrying on a circumference thereof a plurality of mowing blades attached articulately thereto for pivotal movement radially inwardly and outwardly of said circumference whereby said blades may be each manually pivoted radially inwardly to lie within the circumference of said rotating member, said blades being pivotable radially outwardly to describe a blade circle having a diameter greater than that of the circumference of said rotating member; and a carriage housing enclosing a horizontal mowing plane, said carriage housing having a pair of front wheels and a pair of hind wheels, said carriage housing further having a horizontal backing surface corresponding in contour with the backing edge surface of the protective casing of said grass trimmer for receiving said backing edge surface thereon, said horizontal backing surface being provided with a center opening therein sized for just permitting insertion of said mowing mechanism of said grass trimmer therethrough when said blades of said rotating member are pivoted radially inwardly to lie within the circumference of said rotating member, the blade circle of said mowing mechanism projecting beyond the contour of said horizontal backing surface when said backing edge surface of said protective casing is received on said horizontal backing surface of said carriage housing, said carriage housing having a worm-like configuration with an inclined channel for lateral discharge of grass clippings therefrom.

2. The lawn mower according to claim 1, wherein said motor is provided with a driveshaft having a rotor pinion, and wherein a rotational axis of said rotating member is offset, with respect to said driveshaft, toward said front wheels of said carriage housing, and wherein said rotating member is provided with an edge section which has a spur gearing meshing with the rotor pinion of said driveshaft.

3. The lawn mower according to claim 2, wherein said spur gearing is an internal gearing.

4. The lawn mower according to claim 2, wherein the protective casing of the grass trimmer has formed on a bottom wall thereof a downwardly extending stabilizing ring, and wherein said edge section of said rotating member is provided with an upwardly opening slot for engaging said stabilizing ring.

5. The lawn mower according to claim 1, further comprising:

a hold-down claw formed provided on the carriage housing above said horizontal backing surface, the backing edge surface of the protective casing of the grass trimmer being insertable underneath said holding claw; and a locking mechanism provided on the carriage housing in an area of said horizontal backing surface thereof located opposite said hold-down claw, for locking said backing edge surface of said protective casing against said horizontal backing surface of said carriage housing.

6. The lawn mower according to claim 5, wherein said hold-down claw is located proximate said front wheels of said carriage housing and said locking mechanism is located proximate said rear wheels of said carriage housing, said locking mechanism being foot actuable.

7. The lawn mower according to claim 5, wherein said locking mechanism includes a pivotable foot pedal pivotally mounted on a journal carried in the carriage housing, said foot pedal having a hold-down claw, said foot pedal being pivotable towards a locking position wherein the hold-down claw thereof retainably overlaps the backing edge surface of the protective casing of the grass trimmer when said protective casing is received on said horizontal backing surface of said carriage housing, for locking said backing edge surface down on said horizontal backing surface, said foot pedal being also pivotable to an unlocking position for releasing said backing edge surface of said protective casing.

8. The lawn mower according to claim 7, wherein the hold-down claw of the pivotable foot pedal is provided with an inclined stop surface for abutting said backing edge surface of said protective casing during insertion of said mowing mechanism through said center opening, said foot pedal being spring-biased to pivot towards said locking position thereof, whereby, during insertion of said mowing mechanism through said center opening, abutting of said foot pedal hold-down claw inclined stop surface by said protective casing backing edge surface urges said foot pedal to pivot towards said unlocking position until said backing edge surface moves past said inclined stop surface whereupon said foot pedal will be urged under said spring bias to pivot towards said locking position to bring said hold-down claw into locking relation overlapping said backing edge surface of said protective casing.

9. The lawn mower according to claim 1, wherein the protective casing of the grass trimmer is provided with a gliding bow.

* * * * *